United States Patent
Budna et al.

(10) Patent No.: US 10,233,122 B2
(45) Date of Patent: Mar. 19, 2019

(54) METHOD FOR PRODUCING A RAW MATERIAL FOR THE PRODUCTION OF REFRACTORY CERAMIC PRODUCTS, A RAW MATERIAL PRODUCED ACCORDING TO THE METHOD AND A RAW MATERIAL FOR PRODUCING REFRACTORY CERAMIC PRODUCTS

(71) Applicant: Refractory Intellectual Property GmbH & Co. KG, Vienna (AT)

(72) Inventors: Karl Budna, Graz (AT); Thomas Deutsch, Leoben (AT); Rainer Neubock, Graz (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days.

(21) Appl. No.: 15/556,931

(22) PCT Filed: Mar. 23, 2016

(86) PCT No.: PCT/EP2016/056309
§ 371 (c)(1),
(2) Date: Sep. 8, 2017

(87) PCT Pub. No.: WO2016/188648
PCT Pub. Date: Dec. 1, 2016

(65) Prior Publication Data
US 2018/0044242 A1 Feb. 15, 2018

(30) Foreign Application Priority Data
May 28, 2015 (EP) .................................... 15169644

(51) Int. Cl.
*C04B 35/12* (2006.01)
*C04B 35/632* (2006.01)
*C04B 35/047* (2006.01)
*C04B 35/105* (2006.01)
*C04B 35/622* (2006.01)
(Continued)

(52) U.S. Cl.
CPC ............ *C04B 35/12* (2013.01); *C04B 35/047* (2013.01); *C04B 35/105* (2013.01); *C04B 35/62204* (2013.01); *C04B 35/62655* (2013.01); *C04B 35/62695* (2013.01); *C04B 35/632* (2013.01); *C04B 35/66* (2013.01); *C04B 2235/3201* (2013.01); *C04B 2235/3206* (2013.01); *C04B 2235/3217* (2013.01); *C04B 2235/3272* (2013.01); *C04B 2235/3418* (2013.01); *C04B 2235/449* (2013.01); (Continued)

(58) Field of Classification Search
CPC ...................................................... C04B 35/12
USPC .................................................... 423/53, 607
See application file for complete search history.

(56) References Cited

U.S. PATENT DOCUMENTS

| 5,164,173 A * | 11/1992 | Muller | C01G 37/027 252/62.51 C |
| 9,505,663 B2 * | 11/2016 | Linnot | C01G 37/02 |
| 2014/0011031 A1 * | 1/2014 | Linnot | C01G 37/02 428/402 |

FOREIGN PATENT DOCUMENTS

JP 2008231388 A 10/2008

* cited by examiner

*Primary Examiner* — Karl E Group
(74) *Attorney, Agent, or Firm* — Medley, Behrens & Lewis, LLC

(57) ABSTRACT

The invention relates to a method for producing a raw material for the production of refractory ceramic products, a raw material produced by said method, and a raw material for producing refractory ceramic products.

5 Claims, 1 Drawing Sheet

(51) Int. Cl.
*C04B 35/626* (2006.01)
*C04B 35/66* (2006.01)
(52) U.S. Cl.
CPC ............... *C04B 2235/5427* (2013.01); *C04B 2235/5436* (2013.01); *C04B 2235/725* (2013.01)

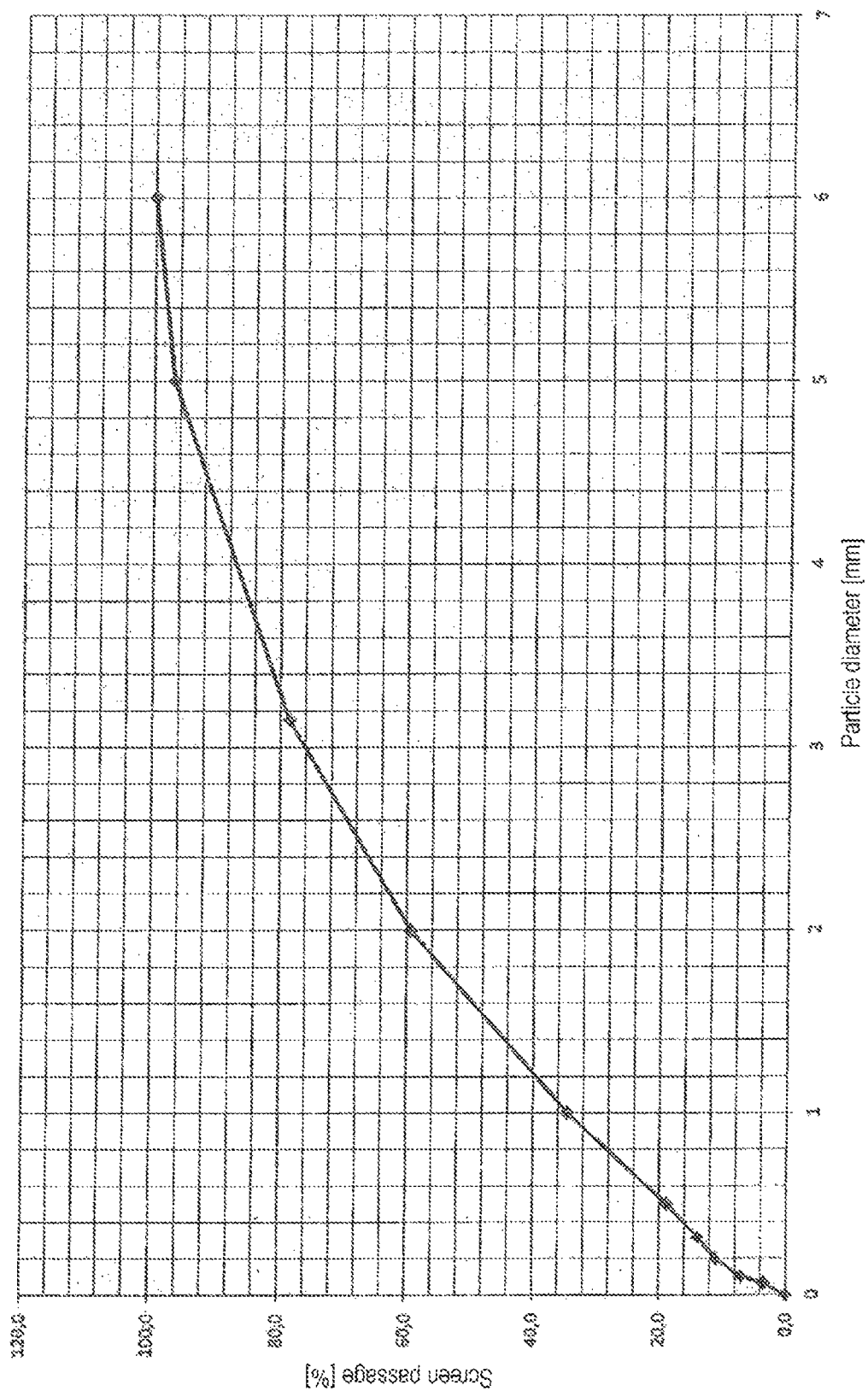

METHOD FOR PRODUCING A RAW MATERIAL FOR THE PRODUCTION OF REFRACTORY CERAMIC PRODUCTS, A RAW MATERIAL PRODUCED ACCORDING TO THE METHOD AND A RAW MATERIAL FOR PRODUCING REFRACTORY CERAMIC PRODUCTS

BRIEF DESCRIPTION OF THE DRAWINGS

The FIGURE illustrates a particle size distribution curve of raw material.

The invention relates to a method for producing a raw material for the production of refractory ceramic products, a raw material produced according to said method, and a raw material for producing refractory ceramic products.

The term "refractory ceramic product" within the meaning of the invention refers more particularly to ceramic products with an application temperature greater than 600° C., and preferably to refractory materials according to DIN 51060, i.e. materials with a pyrometric cone equivalent greater than SK17. More particularly, the pyrometric cone equivalent may be determined according to DIN EN 993-12.

Refractory ceramic products are used in particular for high-temperature applications. More particularly, refractory ceramic products containing chromium oxide are also known. For example, such refractory ceramic products containing chromium oxide are known in the form of so-called chromium corundum bricks. Such chromium corundum bricks are based on chromium oxide ($Cr_2O_3$) and aluminum oxide ($Al_2O_3$). For example, chromium corundum bricks are used in the uptake and treatment of gas melts.

During the use of refractory ceramic products containing chromium oxide, for example chromium corundum bricks, chromium oxide present in the product (more particularly trivalent chromium oxide "Cr(III)" or $Cr^{3+}$, which is more particularly present in the form of $Cr_2O_3$) may be oxidized to hexavalent chromium (i.e. "Cr(VI)" or $Cr^{6+}$). Such hexavalent chromium may subsequently be present in the used products, more particularly in the form of salts, for example in the form of sodium or potassium chromate. Because of the high toxicity and carcinogenicity of such hexavalent chromium compounds, there are strict legal requirements for the treatment of products containing such hexavalent chromium, or Cr(VI). For this reason, used refractory ceramic products containing amounts of Cr(VI) are often impossible to reuse or are reusable only to a limited extent.

However, as products containing chromium oxide, more particularly for example chromium corundum bricks, are high-value products, there is an urgent need to reuse used products containing chromium oxide, more particularly chromium corundum bricks. More particularly, there is an urgent need to reuse such used products containing chromium oxide as recycled raw material for the production of refractory ceramic products.

Because of the above-described toxicity and carcinogenicity of Cr(VI) contained in used products containing chromium oxide, however, used products containing chromium oxide ordinarily cannot be readily used as recycled raw material for the production of refractory ceramic products. Rather, such used products containing chromium oxide must first be treated in order to reduce the content of Cr(VI) in the used products such that there are no health concerns with respect to the use thereof and statutory limit values are met.

In order to reduce the content of Cr(VI) in used products containing chromium oxide, methods were developed by means of which separation or reduction of the Cr(VI) in used products containing chromium oxide is possible. For example, inorganic compounds that are mostly based on divalent iron compounds or sulfide salts are used as reducing agents. Ascorbic acid is also known as a reducing agent.

The known methods for separation or reduction of Cr(VI) are frequently carried out as aqueous methods, wherein the used products containing Cr(VI) and the reducing agent are mixed with one another as highly fine material in an aqueous environment. A drawback of these methods is that the mixture obtained thereby, particularly due to its high fineness, cannot be directly used as a raw material for the production of refractory ceramic products. A further potential drawback is that the waste water generated in such aqueous methods is difficult to treat, as Cr(III) salts, which are also critical from environmental and health standpoints, dissolve in such waste water and such methods are therefore generally uneconomical.

Furthermore, the method is known of converting Cr(VI) into non-critical compounds by melting products containing Cr(VI). However, as this method may cause dustlike chromium compounds to escape, such a melting process is often impossible for reasons pertaining to labor law and environmental law. Moreover, a high energy input is required to carry out such a melting process.

For these reasons, raw materials containing Cr(VI), more particularly in the form of Cr(VI)-containing used refractory products containing chromium oxide, such as chromium oxide bricks, are ordinarily not reused, but are dumped in a landfill after primary use.

The object of the invention is to provide a method by means of which the content of Cr(VI) in raw materials containing Cr(VI) can be reduced. More particularly, the object of the invention is to provide a method by means of which the content of Cr(VI) in used refractory ceramic products containing Cr(VI) and used chromium oxide can be reduced. A further object of the invention is to provide a method that is economically feasible and in which, more particularly, only a small input of energy is required for carrying out the method. A further object of the invention is to provide a method that can be carried out safely from the standpoint of toxicology, more particularly with respect to occupational safety and environmental protection. A further object of the invention is to provide a method by means of which a raw material for producing refractory ceramic products can be produced from the raw material containing Cr(VI). More particularly, the raw material produced by this method should be readily useable for producing refractory ceramic products.

According to the invention, these objects are achieved by providing a method for producing a raw material for the production of refractory ceramic products that comprises the following steps:

provision of a raw material containing Cr(VI) that is present to at least 50% by weight in a particle size greater than 50 μm;

provision of ascorbic acid;

provision of water;

combining of the raw material containing Cr(VI) with e ascorbic acid and the water;

mixing of the raw material containing Cr(VI) with the ascorbic acid and the water; and drying of the raw material containing Cr(VI); wherein the method is carried out such that the particle size of the raw material containing Cr(VI) does not change or does not change significantly during the course of the method.

More particularly, the invention is based on the finding that Cr(VI) in a raw material containing Cr(VI) can be effectively reduced and then dried using little energy in the presence of ascorbic acid and water if the raw material containing Cr(VI) is present in a relatively coarse particle size, more particularly to at least 50% by weight in a particle size greater than 50 μm.

More particularly, the invention is also based on the finding that the Cr(VI) is also effectively reducible by the ascorbic acid if the raw material containing Cr(VI) is present in such a coarse particle size. In contrast to the previously predominant view, a raw material containing Cr(VI) therefore need not be present in an extremely fine particle size, more particularly not in a particle size predominantly greater than 50 μm, in order to be effectively reducible by ascorbic acid. Moreover, based on this finding, it was found according to the invention that the raw material containing Cr(VI) present in the coarse particle size according to the invention can be dried with a significantly lower energy input than in an extremely fine particle size, more particularly raw material present in a particle size predominantly greater than 50 μm according to the prior art. A further advantage is that no energy need be used in carrying out the method according to the invention for crushing the raw material containing Cr(VI) because it must be provided in a particle size predominantly greater than 50 μm for carrying out the method for reducing its content of Cr(VI) or must be crushed to such a particle size during the course of the method. Finally, it was found that in treatment of raw materials containing Cr(VI) by the method according to the invention, significantly less effort is required for treatment of waste water generated by said method, as due to the coarse particle size of the raw materials containing Cr(VI), only minimal amounts of Cr(III) salts dissolve in the water, and waste water generated in this case is therefore significantly easier to treat than the waste water generated in methods according to the prior art.

Overall, therefore, the method according to the invention allows economical and at the same time technically effective reduction of the content of Cr(VI) in raw materials containing Cr(VI).

According to the method according to the invention, a Cr(VI)-containing raw material, ascorbic acid, and water are first provided and combined, and then mixed into a mixture. The mixture is finally dried.

During the combining and mixing of the raw material containing Cr(VI) with the ascorbic acid, Cr(VI) is reduced by the ascorbic acid, and in this process, more particularly reduced to a toxicologically harmless oxidation state or a toxicologically harmless chromium compound. In this case, more particularly, it is decisive for the success of the method according to the invention that the raw material containing Cr(VI) is not changed or is not changed to a significant extent during the course of the method with respect to its particle size, i.e. in particular is not crushed during the combining and mixing with the ascorbic acid and the water and the subsequent drying. The particle size of the raw material containing Cr(VI) provided for carrying out the method thus also fully or essentially corresponds to the particle size of this raw material after its treatment according to the method of the invention.

The raw material containing Cr(VI) provided for the method according to the invention is present as bulk material, i.e. as a granular mixture or a mixture of granules. According to the invention, the grains of the raw material containing Cr(VI) provided for the method according to the invention are present to at least 50% by weight in a particle size greater than 50 μm, i.e. for example also to at least 50, 60, 70, 80 or 90% by weight in a particle size greater than 50 μm, 63 μm, 100 μm, 200 μm, 350 μm, 500 μm, 1.0 mm, or 2.0 mm. The above data in % by weight refer respectively to the total weight of the raw material containing Cr(VI).

Moreover, the raw material containing Cr(VI) is preferably completely or predominantly present in a particle size not greater than 10 mm, i.e. for example to 100% by weight or to at least 90% by weight in a particle size not greater than 10, 9, 8, 7, 6, or 5 mm. The above data in % by weight again refer respectively to the total weight of the raw material containing Cr(VI).

As mentioned above, the method according to the invention is carried out in such a manner that the particle size of the raw material containing Cr(VI) does not change or does not change significantly during the course of the method. More particularly, in this respect, it is provided according to the invention that the raw material containing Cr(VI), during the course of the method according to the invention—i.e. in particular during combining and mixing with ascorbic acid and water and during the subsequent drying—has a particle size as stated above, i.e. the particle size that the raw material containing Cr(VI) provided for the method according to the invention may have. Provided that the particle size of the raw material containing Cr(VI) does not change during the course of the method, the particle size of the raw material containing Cr(VI) treated by the method according to the invention corresponds to the particle size of the raw material containing Cr(VI) originally provided for the method according to the invention. Provided that the particle size of the raw material containing Cr(VI) does not significantly change due to its treatment according to the method of the invention, although the particle size of the raw material containing Cr(VI) originally provided for the method according to the invention may change during the course of the method, the raw material containing Cr(VI) is present even after its treatment by the method according to the invention in a particle size that the raw material containing Cr(VI) provided for the method according to the invention may have, as stated above.

The data given herein on particle size are determined according to DIN 66165-1:1987-04 and DIN 66165-2:1987-04.

The raw material containing Cr(VI) may be an individual raw material or a raw material in the form of a raw material mixture, i.e. composed of raw materials of differing origin and/or composition. More particularly, the raw material containing Cr(VI) may comprise one or a plurality of used refractory ceramic products containing chromium oxide. A refractory product containing "used" chromium oxide is understood herein to refer to a refractory ceramic product containing chromium oxide that has already been used for its originally intended purpose. More particularly, the raw material containing Cr(VI) provided for carrying out the method according to the invention may for example either (i) comprise a raw material based on used chromium corundum bricks or be composed of used chromium corundum bricks and/or (ii) comprise a raw material based on used magnesium chromite bricks or be composed of used magnesium chromite bricks. For example, these used chromium corundum bricks may be chromium corundum bricks that have already been used for their originally intended purpose, for example as aggregate lining for the uptake and treatment of glass melts. Used magnesium chromite bricks may for example be magnesium chromite bricks that have already been used for their originally intended purpose, for example as aggregate lining for the uptake and treatment of iron, steel, and nonferrous metal melts, lining for cement rotary kilns, or use in regenerative chambers of glass melting furnaces.

In order to provide used refractory ceramic products containing chromium oxide, more particularly i.e. for example chromium corundum and/or magnesium chromite bricks, for carrying out the method according to the invention as a raw material containing Cr(VI), these products may be crushed and then provided as raw materials containing Cr(VI) for carrying out the method according to the invention. After crushing, the products may optionally be processed with respect to their particle size such that they have the particle size stated above of the raw material containing Cr(VI) provided for carrying out the method according to the invention.

In general, any amount of Cr(VI) may be contained in the raw material containing Cr(VI) provided for carrying out the method according to the invention. More particularly, the content of Cr(VI) in the raw material containing Cr(VI) provided for carrying out the method according to the invention may be greater than a toxicologically critical level, for example greater than 500 ppm or greater than 1,000 ppm. In general, however, the content of Cr(VI) in the raw material containing Cr(VI) provided for the method may also be much greater than these amounts, for example greater than 1,500, 2,000, 3,000, 4,000, or 5,000 ppm. For example, the content of Cr(VI) in the raw material containing Cr(VI) may be up to 10,000 ppm or above.

The data given herein on amounts of Cr(VI) are determined according to DIN EN 15192:2007-02.

The raw material containing Cr(VI) provided for carrying out the method according to the invention may e.g. be a raw material based on chromium corundum, i.e. a raw material based on chromium oxide ($Cr_2O_3$) and aluminum oxide ($Al_2O_3$). More particularly, as stated above, the raw material containing Cr(VI) may be a raw material based on chromium corundum in the form of chromium corundum bricks, more particularly used chromium corundum bricks. For example, the raw material containing Cr(VI) provided for carrying out the method according to the invention may contain a total weight of chromium oxide and aluminum oxide of at least 90% by weight, i.e. for example at least 93, 95, 96, 97 or 98% by weight. For example, the content of chromium oxide in the raw material containing Cr(VI) may be at least 10 or 15% by weight and e.g. a maximum of 90, 80, 70, 60, 50, 40, 30 or 25% by weight. The content of aluminum oxide in the raw material containing Cr(VI) may e.g. be at least 10, 20, 30, 40, 50, 60 or 70% by weight and e.g. a maximum of 90, 85 or 80% by weight. The above data in % by weight refer respectively to the total weight of the raw material containing Cr(VI), more particularly a raw material based on chromium corundum.

Alternatively or cumulatively, for example, the raw material containing Cr(VI) provided for carrying out the method according to the invention may be a raw material based on magnesium chromite, i.e. a raw material based on chromium oxide ($Cr_2O_3$) and magnesium oxide or magnesia (MgO). More particularly, as stated above, the raw material containing Cr(VI) may be a raw material based on magnesium chromite in the form of magnesium chromite bricks, more particularly used magnesium chromite bricks. For example, the raw material containing Cr(VI) provided for carrying out the method according to the invention may have a total weight of chromium oxide and magnesium oxide of at least 70% by weight, i.e. for example at least 71, 72, 73, 74, 75, 76 or 77% by weight. For example, the content of chromium oxide in the raw material containing Cr(VI) may be at least 5, 10 or 15% by weight, and e.g. a maximum of 40, 35, 30, 29, 28, 27 or 26% by weight. The content of magnesium oxide in the raw material containing Cr(VI) may be e.g. at least 40, 50, 55, 56 or 57% by weight, and e.g. a maximum of 85, 80, 75, 70, 69, 68, 67 or 66% by weight. The content of $Fe_2O_3$ in the raw material containing Cr(VI) may e.g. be in the range of 5 to 20% by weight. The content of $Al_2O_3$ in the raw material containing Cr(VI) may e.g. be in the range of 2 to 10% by weight. The above data in % by weight refer respectively to the total weight of the raw material containing Cr(VI), more particularly a raw material based on magnesium chromite.

Alternatively, a raw material containing Cr(VI) provided for carrying out the method according to the invention may have a total weight of chromium oxide, magnesium oxide, and aluminum oxide of at least 70% by weight, i.e for example at least 75, 80 or 90% by weight. For example, the content of chromium oxide in such a raw material containing Cr(VI) may be at least 10 or 15% by weight and e.g. a maximum of 30 or 25% by weight. For example, the content of aluminum oxide in such a raw material containing Cr(VI) may be at least 5 or 10% by weight and e.g. a maximum of 80 or 70% by weight. For example, the content of magnesium oxide in such a raw material containing Cr(VI) may be in the range of 0 to 65% by weight. More particularly, such a raw material containing Cr(VI) provided for carrying out the method according to the invention may e.g. be a mixture of raw materials based on chromium corundum and magnesium chromite, wherein in particular, these raw materials may have the composition described above. The above data in % by weight refer respectively to the total weight of the raw material containing Cr(VI), more particularly a raw material based on chromium corundum and magnesium chromite.

In general, the ascorbic acid for carrying out the method according to the invention may be provided in any desired form, e.g. in at least one of the following forms: as bulk material or as a solution.

If the ascorbic acid for carrying out the method according to the invention is provided as bulk material, said ascorbic acid may be present e.g. in granulated form. For example, if ascorbic acid is provided in the form of bulk material, more particularly in the form of granules, it may be present to at least 80, 90 or 100% by weight in a particle size of at least 0.1 mm, 0.5 mm or 1.0 mm, and for example in a maximum particle size of 10, 9, 8, 7 or 6 mm, relative respectively to the total weight of ascorbic acid, in the form of bulk material. The advantage of ascorbic acid provided in a corresponding particle size lies in particular in its favorable manageability.

If the ascorbic acid for carrying out the method according to the invention is provided in the form of a solution, it may be provided in particular in the form of an aqueous solution, for example in the form of a 5 to 50% aqueous solution, i.e. for example also in the form of a 10 to 30% aqueous solution.

The water may be provided e.g. in pure form for carrying out the method according to the invention. For example, however, it may also be partially or completely provided as a component of an aqueous ascorbic acid granulate for carrying out the method according to the invention.

During the combining of the raw material containing Cr(VI) with the ascorbic acid and water and the subsequent mixing, the ascorbic acid more particularly reduces the Cr(VI) of the raw material containing Cr(VI) to trivalent chromium, i.e. Cr(III). This reaction can be represented in simplified form as follows:

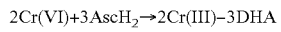

$$2Cr(VI) + 3AscH_2 \rightarrow 2Cr(III) - 3DHA$$

where
Cr(VI): hexavalent chromium
$AscH_2$: ascorbic acid
Cr(III): trivalent chromium
DHA: dehydroascorbic acid.

Stoichiometrically, therefore, 3 mol of ascorbic acid is required for the complete reduction of 2 mol of hexavalent chromium to 2 mol of trivalent chromium, i.e. 3 mol of ascorbic acid.

For carrying out the method according to the invention, ascorbic acid is preferably provided at least in a sufficient amount to allows complete reduction of the Cr(VI) in the raw material containing Cr(VI) to Cr(III) to take place stoichiometrically. Accordingly, for example, ascorbic acid may be provided in an amount such that the molar ratio of ascorbic acid to Cr(VI) in the raw material containing Cr(VI) is at least 1.5, i.e. for example in the range of 1.5 to 3, in the range of 1.5 to 2.5, in the range of 1.5 to 2, or in the range of 1.5 to 1.8.

For carrying out the method according to the invention, water is preferably provided in an amount such that the raw material containing Cr(VI) mixed with ascorbic acid and water has a moist but still friable consistency. According to the invention, it has been found that with the particle size according to the invention of the raw material containing Cr(VI), this is possible if water is provided in an amount in the range of 1 to 10% by weight relative to the total weight of the raw material containing Cr(VI) provided for carrying out the method according to the invention. Accordingly, water may also be provided e.g. in a maximum amount of 9, 8, 7 or 6% by weight.

In carrying out the method according to the invention, the raw material containing Cr(VI), the ascorbic acid, and the water may be combined, individually or in combination respectively. For example, one may first combine the raw material containing Cr(VI) and water and then combine them with the ascorbic acid. Alternatively, for example, one may also first combine the raw material containing Cr(VI) and the ascorbic acid and then combine them with the water.

It was found according to the invention that in carrying out the method according to the invention, the reduction of the Cr(VI) to Cr(III) and the time required for the drying of the raw material containing Cr(VI) mixed with ascorbic acid and water may react sensitively to further components that are present during the conduct of the method according to the invention in addition to the raw material containing Cr(VI), the ascorbic acid, and water. It may therefore be provided according to the invention that in carrying out the method according to the invention, the raw material containing Cr(VI) may be combined, mixed and dried with further components in addition to ascorbic acid and water. During its treatment by the method according to the invention, the raw material containing Cr(VI) is preferably combined with such further components at most in amounts of less than 5% by weight, i.e. for example also in amounts of less than 4, 3, 2 or less than 1% by weight relative to the total weight of the raw material containing Cr(VI).

The raw material containing Cr(VI) may be combined with the ascorbic acid and the water, for example in a mixer in which these components may later be combined with one another. According to the invention, it has been found in this case that it may be advantageous for the reduction of the Cr(VI) in the raw material containing Cr(VI) by the ascorbic acid if the components are added to the mixer batchwise.

The raw material containing Cr(VI) combined e.g. in a mixer with ascorbic acid and water is mixed with these components, more particularly in a mixer, for example in the mixer in which the components were combined. For example, a drum mixer may be used as a mixer for mixing the components.

The raw material containing Cr(VI) is mixed with the ascorbic acid and the water for a duration e.g. of at least 5 minutes and e.g. a maximum of 60 minutes, i.e. for example also for at least 10 minutes or for example a maximum of 30, 25, 20, 18 or 15 minutes.

In the method according to the invention, the combining and mixing of the raw material containing Cr(VI) with ascorbic acid and water may be carried out in particular under ambient conditions, i.e. for example at temperatures above 0° C. and below 30° C.

After the raw material containing Cr(VI) is mixed with ascorbic acid and water, the raw material containing Cr(VI) is dried. For this purpose, the raw material containing Cr(VI) may be transferred for example to a dryer, for example a drum dryer.

The raw material containing Cr(VI) may be dried for example at a temperature in the range of 100 to 200° C., i.e. for example also at a temperature of at least 110, 120 or 130° C., and for example at a maximum temperature of 190, 180 or 170° C. The dryer may be gas-driven, for example natural-gas-driven.

The raw material containing Cr(VI) is preferably dried for a duration of less than 3 hours, i.e. for example also for a duration of less than 2.5 or less than 2 or less than 1.5 hours, and for example for a duration of at least 0.5 or 1 or 1.5 hours.

The raw material containing Cr(VI) is preferably further dried to a residual moisture content in the range of 0 to 1.5% by weight of water relative to the total weight of the raw material containing Cr(VI) after drying, i.e. for example to a residual moisture content of at least 0.05 or 0.1% by weight and for example to a maximum residual moisture content of 1 or 0.5% by weight.

After drying, the material containing Cr(VI), which was originally provided for carrying out the method according to the invention and has now been treated by the method according to the invention, is present in an unchanged or not significantly changed particle size equal to that of the raw material containing Cr(VI) originally provided for carrying out the method according to the invention, but with a reduced content of Cr(VI). In any case, the raw material containing Cr(VI) treated according to the invention has a particle size that a raw material containing Cr(VI) originally provided for carrying out the method according to the invention may have, as stated above. The chemical composition of the raw material containing Cr(VI) treated by the method according to the invention essentially corresponds to the chemical composition of the raw material containing Cr(VI) originally provided for the method, wherein the treated raw material may further contain oxalic acid as a degradation product of the ascorbic acid, and optionally, amounts of ascorbic acid and chromium ascorbate complexes as well.

The content of Cr(VI) in the raw material containing Cr(VI) treated according to the invention may be reduced to a content of less than 500 ppm. The raw material containing Cr(VI) treated according to the invention may thus have a content of Cr(VI) of less than 500 ppm, i.e. for example also less than 400 or less than 300 ppm.

The raw material containing Cr(VI) treated according to the invention may be provided for the production of refractory ceramic products. It is particularly advantageous in this context that the raw material containing Cr(VI) treated according to the invention, because of the particle size according to the invention, may be directly, i.e. without further treatment or processing, provided as a raw material for the production of refractory ceramic products, A raw material containing Cr(VI) treated by he method according to the invention is also subject matter of the invention.

If a raw material containing Cr(VI) in the form of used chromium corundum bricks and/or used magnesium chromite bricks is provided for carrying out the method according to the invention, this raw material containing Cr(VI) treated according to the invention may in particular comprise the oxides aluminum oxide, magnesium oxide and chromium oxide. Such a raw material may further comprise oxalic acid as a degradation product of the ascorbic acid. Finally, in addition to $Al_2O_3$, MgO and $Cr_2O_3$ and oxalic acid, this raw material may optionally also contain amounts of ascorbic acid and chromium ascorbate complexes.

Further subject matter of the invention is a raw material containing Cr(VI more particularly a raw material containing Cr(VI) treated by the method according to the invention, for the production of refractory ceramic products, containing $Cr_2O_3$; and at least one of the oxides $Al_2O_3$ or MgO;

oxalic acid; and

Cr(VI), wherein the content of Cr(VI) in the raw material is less than 500 ppm, the moisture content is less than 1.5% by weight, and the raw material is present to at least 50% by weight in a particle size greater than 50 μm.

The raw material may be present in the particle size in which the raw material containing Cr(VI) provided for carrying out the method according to the invention may be present.

The $Cr_2O_3$, $Al_2O_3$, and MgO in the raw material may be present in the amounts in which they may be present in a raw material containing Cr(VI) provided for carrying out the method according to the invention.

Moreover, the content of Cr(VI) in the raw material and its moisture content may correspond to the above-mentioned amounts contained in a raw material containing Cr(VI) treated by the method according to the invention. Therefore, the raw material containing Cr(VI) according to the invention may e.g. have a content of Cr(VI) of less than 500 ppm, i.e. for example also less than 400, 300, 200 or 100 ppm. Moreover, the raw material containing Cr(VI) according to the invention may e.g. have a content of Cr(VI) greater than 10 ppm, i.e. for example also greater than 50 ppm or greater than 100 ppm. The data given above refer respectively to the total weight of the raw material containing Cr(VI) according to the invention, more particularly also if said raw material is present in the form of a raw material containing Cr(VI) treated by the method according to the invention.

In addition to $Cr_2O_3$, $Al_2O_3$, MgO and oxalic acid, the raw material according to the invention may also optionally contain amounts of $Fe_2O_3$, ascorbic acid, and chromium ascorbate complexes.

In addition to amounts of $Cr_2O_3$, $Al_2O_3$, MgO, $Fe_2O_3$, oxalic acid, Cr(VI), ascorbic acid, and chromium ascorbate complexes, the raw material containing Cr(VI) according to the invention contains no further components, or optionally, further components only in small amounts, for example in an amount of less than 10% by weight, i.e. for example also in an amount of less than 5, 4, 3, 2 or 1% by weight, relative respectively to the total weight of the raw material according to the invention.

Further features of the invention are derived from the claims, the figures, and the accompanying description of the figures.

All of the features of the invention, individually or in combination, may be combined with one another as desired.

An example of the invention is explained below.

According to the example, a raw material containing Cr(VI), an aqueous ascorbic acid granulate, and an ascorbic acid granulate were provided for carrying out the method according to the invention.

The raw material containing Cr(VI) provided was in the form of used, crushed chromium corundum bricks. The raw material containing Cr(VI) was composed of about 78.8% by weight of aluminum oxide and 19.8% by weight of chromium oxide, with the remainder being composed of further oxides, more particularly $ZrO_2$, $Na_2O$, $SiO_2$ and MgO. The total content of Cr(VI) in the raw material containing Cr(VI) was about 4.000 ppm. The corresponding raw material containing Cr(VI) for carrying out the method according to the invention was present as bulk material, wherein about 97% by weight was present in a particle size greater than 50 μm. The particle size distribution curve of the raw material is given in the FIGURE.

The ascorbic acid provided for carrying out the method according to the invention was present on the one hand as a granulate and on the other in the form of an aqueous solution. The ascorbic acid granulate was composed of granules of a particle size in the range of 2 to 3 mm. The aqueous ascorbic acid granulate was in the form of a 15% aqueous solution. The weight ratio of the ascorbic acid granulate to the aqueous ascorbic acid granulate was about 1:0.3. The total weight of ascorbic acid in the granulate and in the aqueous solution was such that the ratio of the molar weight of the ascorbic acid provided for carrying out the method according to the invention to the molar weight of the Cr(VI) in the raw material containing Cr(VI) provided for carrying out the method according to the invention was about 1.5.

At the same time, this resulted in a weight percentage of water in the aqueous ascorbic acid granulate of 5.7% by weight relative to the total weight of the raw material containing Cr(VI) provided for carrying out the method according to the invention.

The water provided for carrying out the method according to the invention was present exclusively as a component of the aqueous ascorbic acid granulate.

In order to combine and mix the raw material containing Cr(VI) with the ascorbic acid granules and the aqueous ascorbic acid granulate, these components were fed into a drum mixer, and by starting said drum mixer, combined and mixed with one another therein. The mixing time in the drum mixer was 15 minutes.

The raw material containing Cr(VI), after mixing in the drum mixer with the ascorbic acid granules and the aqueous ascorbic acid granulate, was fed into a drum dryer and dried therein at a temperature of 150° C. for a duration of about 1.5 hours.

After mixing and before drying, the moisture content of the raw material containing Cr(VI) was about 5.7% by weight relative to the total weight of the raw material containing Cr(VI).

After drying in the drum dryer, the residual moisture content of the raw material containing Cr(VI) was about 0.1% by weight relative to the total weight of the treated raw material containing Cr(VI).

During mixing of the raw material containing Cr(VI) with the ascorbic acid, the content of Cr(VI) in the raw material containing Cr(VI) was substantially reduced by the ascorbic acid. In total, the content of Cr(VI) in the raw material containing Cr(VI) could be reduced from an initial content of 4,000 ppm to about 300 ppm in the treated raw material containing Cr(VI).

The particle size of the raw material containing Cr(VI) provided for carrying out the method was essentially unchanged to a significant degree during the course of the method. The particle size distribution curve of the raw material containing Cr(VI) treated by the method according to the example therefore corresponded to the particle size distribution curve of the raw material originally provided for carrying out the method.

The chemical composition of the raw material containing Cr(VI) treated by the method according to the example corresponded to the chemical composition of the raw material containing Cr(VI) originally provided for the method according to the example.

The raw material containing Cr(VI) treated by the method according to the example was provided as a raw material for the production of refractory ceramic products.

The invention claimed is:

1. Method for producing a raw material for the production of refractory ceramic products that comprises the following steps:
    provision of a raw material containing Cr(VI) that is present to at least 50% by weight in a particle size greater than 50 μm;
    provision of ascorbic acid;
    provision of water;
    combining of the raw material containing Cr(VI) with the ascorbic acid and the water;
    mixing of the raw material containing Cr(VI) with the ascorbic acid and the water;
    drying of the raw material containing Cr(VI); wherein the method is carried out such that the particle size of the raw material containing Cr(VI) does not change or does not change significantly during the course of the method.

2. Method as claimed in claim 1, in which the raw material containing Cr(VI) is provided in the form of used refractory ceramic products.

3. Method as claimed in claim 1, in which the raw material containing Cr(VI) is provided with a content of Cr(VI) of at least 500 ppm.

4. Method as claimed in claim 1, in which after drying, the raw material containing Cr(VI) has a content of Cr(VI) of less than 500 ppm.

5. Method as claimed in claim 1, in which after drying, the raw material containing Cr(VI) is provided as a raw material for the production of refractory ceramic products.

* * * * *

UNITED STATES PATENT AND TRADEMARK OFFICE
CERTIFICATE OF CORRECTION

Page 1 of 1

PATENT NO. : 10,233,122 B2
APPLICATION NO. : 15/556931
DATED : March 19, 2019
INVENTOR(S) : Karl Budna, Thomas Deutsch and Rainer Neubock It is certified that error appears in the above-identified patent and that said Letters Patent is hereby corrected as shown below:

In the Specification

At Column 7, Line 10, please cancel the formula and replace with the following formula:
$2\ Cr(VI) + 3\ AscH_2 \rightarrow 2\ Cr(III) + 3\ DHA$ Signed and Sealed this
Twenty-seventh Day of August, 2019

Andrei Iancu
*Director of the United States Patent and Trademark Office*